Jan. 17, 1928.
R. L. PARISH
1,656,229
CONTAINER AND SEALING MEANS THEREFOR
Filed May 14 1927
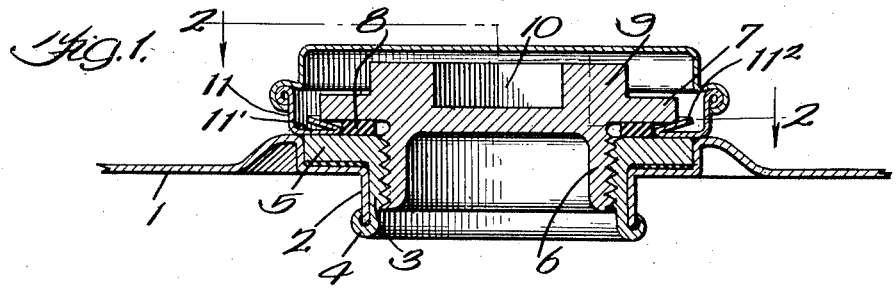
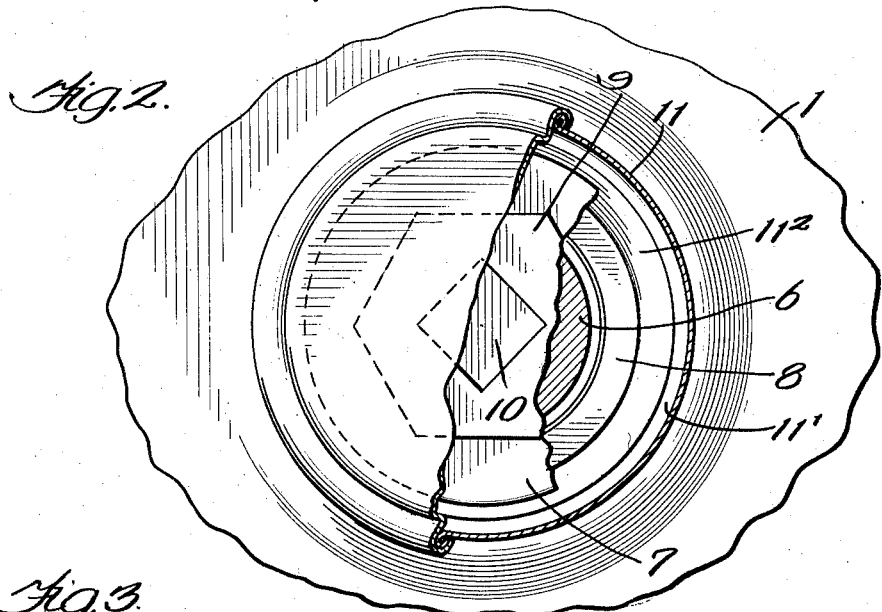
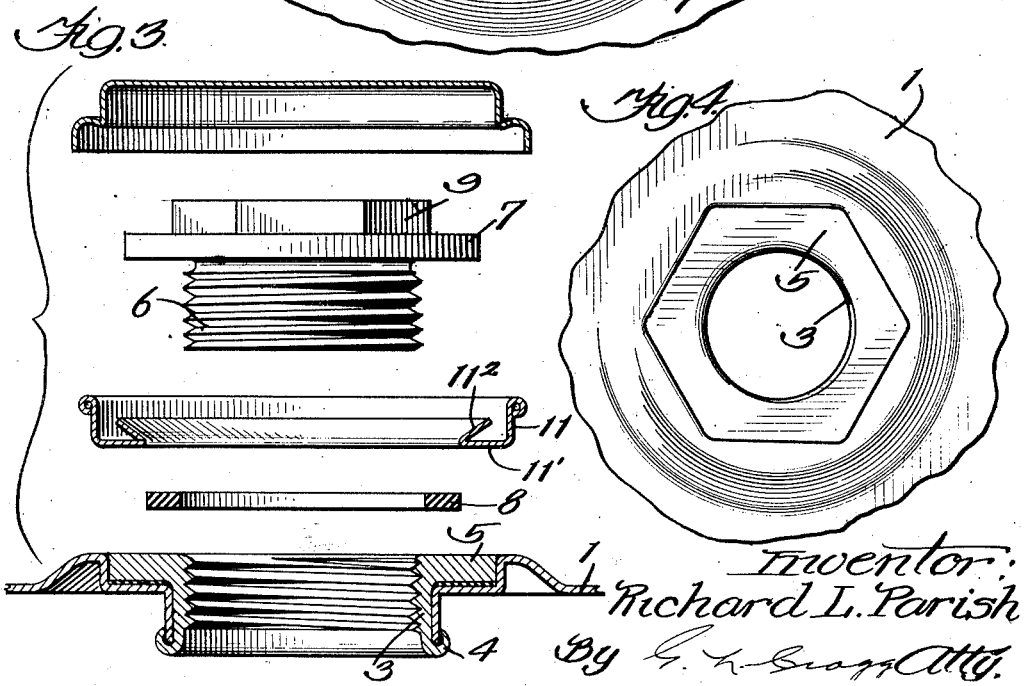
Inventor:
Richard L. Parish Patented Jan. 17, 1928.

1,656,229

UNITED STATES PATENT OFFICE.

RICHARD L. PARISH, OF CHICAGO, ILLINOIS, ASSIGNOR TO AMERICAN FLANGE & MANUFACTURING CO., OF CHICAGO, ILLINOIS, A CORPORATION OF ILLINOIS.

CONTAINER AND SEALING MEANS THEREFOR.

Application filed May 14, 1927. Serial No. 191,425.

My invention relates to containers which are provided with bungs in the form of threaded plugs which are received within the threaded interiors of bushings that are assembled with wall portions of the containers, the invention finding particular use in connection with barrels in which oil or other liquid is packaged for shipment.

The invention has for its object the provision of improved means for obstructing undetectable access to and removal of the plugs. These plugs or bungs are provided with flanges at their outer ends which press upon annular sealing gaskets that are interposed between the plug flanges and the contiguous container walls. In a well-known structure, an interiorly threaded bushing is assembled with a container and receives a closure plug, this bushing having a flange which is in lapping relation to the portion of the container wall that surrounds the opening in which the body of the bushing is received. An annular sealing gasket is interposed between the flange upon the plug and the flange upon the bushing. To guard against the undetectable access to and removal of the plug, a hood or guard is employed having a body portion clamped between the plug flange and the bushing flange and a cap portion joined with the body portion and covering the outer end of the plug. In order that the sealing gasket above referred to might be sealed and guarded from removal, the base portion of the hood is clamped between the gasket and the bushing flange by the action of the plug flange when the plug is screwed home. It is common practice to paint the container, especially if it is employed for packaging oil or other liquid for shipment, and also to paint the flange of the bushing. If care is not taken, the paint coating may be so rough, that leakage is apt to occur between the base portion of the hood and the bushing flange. I, therefore, reduce the external diameter of the sealing gasket or enlarge the external diameters of the plug and bushing flanges so that an annular space surrounds the gasket and intervenes between the flanges and I insert a portion of the hood base in this annular space to confine this portion between the two flanges. The assembly between the hood base and the plug and bushing flanges is desirably one that permits the hood to be turned with relation to the plug and bushing, so that a turning of the hood will not unscrew the plug. This is an advantageous feature aside from the relationship of the gasket to the structure. In order that the gasket may still be guarded from removal, I make the portion of the hood base that is thus interposed between the two flanges of compressible spring formation which causes the base portion of the hood to be close to the container and bushing flange.

The invention will be more fully explained in connection with the accompanying drawing in which Fig. 1 is a view in diametrical cross section illustrating a container wall equipped in accordance with my invention; Fig. 2 is a plan view of the structure shown in Fig. 1 with parts broken away; Fig. 3 is a view showing parts that appear in Fig. 1 in separated relation, some of these parts being shown in section; and Fig. 4 is a face view of the container wall with a flanged bushing assembled therewith, the gasket and plug being removed.

The container, such as a barrel, has one wall 1 thereof formed with a depending rim 2 which surrounds a circular hole formed through this wall. An interiorly threaded bushing 3 is snugly received within this hole and is closely surrounded by said rim, this bushing being shown with an outwardly curled inner edge portion 4 which grips the inner edge of said rim 2 and a circumscribing flange 5 which is tightly seated upon the wall 1, this flange desirably lapping this wall on the exterior of the container. The closure plug 6 is screwed within the bushing 3 and is formed with a circumscribing flange 7 which laps the flange 5 and wall 1, an annular sealing gasket 8 being desirably interposed between the flanges to render the joint between the plug and bushing fluid-tight. The outer end of the plug is formed with two tool engaging formations, one in the form of an enlargement 9 which is of hexagonal or polygonal exterior contour, and the other in the form of a recess 10 extending through the enlargement 9 and into the body of the plug, this recess being of square or other contour to receive a wrench having a plug formation snugly receivable within and corresponding in shape to said recess.

The external diameter of the gasket is less than the external diameters of the plug and bushing flanges so that an annular space surrounding the gasket intervenes between the flanges which thus extend radially beyond the gasket. The sealing device or guard is preferably in the form of a hood formed of springy or resilient sheet metal or material and comprising a body or skirt portion 11 which has an inwardly turned annular base part 11′ confined, preferably loosely, between the two flanges 5 and 7 and in the annular space surrounding the gasket. In order to guard the gasket from access, the base part 11′ has a conically tapering continuation 11² engaged by one of the flanges and collapsed to the extent that the plug flange approaches the bushing flange, the space thus occupied by the base parts 11′, 11² being closed against access to the bushing. In the preferred embodiment of the invention the part 11² is engaged by the plug flange and is surrounded by the hood. The hood also includes a cap portion 12 which is not initially assembled or fully assembled with the body or skirt portion 11, the closure plug being tightly applied before the cap is finally assembled to enclose the plug portions 7, 9. A suitable tool is employed for so thoroughly incorporating the ring portions of the hood body and cap together that the cap portion can not be removed without the removal being detectable. It will be apparent that the hood may be turned without turning the plug, due to the slippage engagement of the hood parts 11′, 11² with the plug and bushing.

All of the plug upon the exterior of the container is thoroughly guarded from undetectable access by the construction described. The gasket 8 has direct engagement with the opposed faces of the plug and bushing flanges and being of rubber or similar conformable material, it will adapt itself to irregularities that might be due to paint upon portions engaged thereby.

Having thus described my invention, I claim:

1. The combination with a container formed with a hole through a wall thereof; of a closure plug within said hole and having a flange lapping said wall; a sealing gasket clamped between the plug flange and said container wall, said flange projecting radially beyond the gasket; and an annular guard having a base portion confined between said plug flange and container wall in the space unoccupied by the gasket.

2. The combination with a container formed with a hole through a wall thereof; of a closure plug within said hole and having a flange lapping said wall; a sealing gasket clamped between the plug flange and said container wall, said flange projecting radially beyond the gasket; and a hood comprising a body portion having a base portion confined between said plug flange and container wall in the space unoccupied by the gasket, and in slipping engagement with said flange, and a cap portion joined with said body portion and covering the outer end of the plug.

3. The combination with a container formed with a hole through a wall thereof; of a closure plug within said hole and having a flange lapping said wall; and an annular guard having a base portion of resilient material and compressible between said plug flange and container wall.

4. The combination with a container formed with a hole through a wall thereof; of a closure plug within said hole and having a flange lapping said wall; and a hood comprising a body portion having a base portion confined between said plug flange and container wall and in slipping engagement with said flange, and a cap portion joined with said body portion and covering the outer end of the plug.

5. The combination with a container formed with a hole through a wall thereof; of a closure plug within said hole and having a flange lapping said wall; and a hood comprising a body portion having a base portion of resilient material bent back upon itself and compressible between said plug flange and container wall; and a cap portion joined with said body portion and covering the outer end of the plug.

In witness whereof, I hereunto subscribe my name.

RICHARD L. PARISH.